United States Patent [19]
Taira

[11] 3,721,751
[45] March 20, 1973

[54] COLOR TELEVISION RECEIVER

[75] Inventor: Yoshiharu Taira, Shiyuku-ku, Tokyo, Japan

[73] Assignee: Sony Corporation, Tokyo, Japan

[22] Filed: June 15, 1971

[21] Appl. No.: 153,251

[52] U.S. Cl. ....................178/5.4 P
[51] Int. Cl. ....................H04n 9/02
[58] Field of Search........178/5.4, 5.4 P, 5.4 S, 5.4 C, 178/5.4 CD, 5.4 SD

[56] References Cited

UNITED STATES PATENTS

| | | | |
|---|---|---|---|
| 3,597,530 | 8/1971 | Hartwich | 178/5.4 P |
| 3,548,091 | 12/1970 | Backwolot | 178/5.4 CD |
| 3,449,510 | 6/1969 | Steinkopf | 178/5.4 C |

*Primary Examiner*—Richard Murray
*Attorney*—Lewis H. Eslinger et al.

[57] ABSTRACT

In a decoding system to receive PAL television signals, one reference sub-carrier signal is produced with the proper phase by controlling an oscillator with every burst signal and utilizing the time constant in the oscillator system to average the alternating phase of the burst signal. A second chrominance signal is demodulated by selecting alternate bursts and using them to control an oscillator to demodulate the chrominance signal along an axis other than the correct one. The resultant demodulated signals are properly combined in a matrix to separate the component color signals. Alternatively, burst-controlled signals with alternating phase can be vectorially added to burst control signals with the correct, fixed phase to produce reference sub-carrier signals of the correct phase and phase alternation for both chrominance components.

14 Claims, 19 Drawing Figures

INVENTOR
YOSHIHARU TAIRA
BY
Lewis H. Eslinger

INVENTOR.
YOSHIHARU TAIRA
BY
Lewis H. Eslinger

INVENTOR
YOSHIHARU TAIRA
BY
Lewis H. Eslinger

INVENTOR.
YOSHIHARU TAIRA
BY
Louis H. Epling

INVENTOR.
YOSHIHARU TAIRA
BY
Lewis H. Eslinger

COLOR TELEVISION RECEIVER

BACKGROUND OF THE INVENTION

1. Field of the Invention

This invention relates to color television receivers adapted to receive signals transmitted in accordance with the phase alternation by line system commonly referred to as the PAL system. In particular, the invention relates to a decoding system for use in a color television receiver to receive signals transmitted according to the PAL system.

2. The Prior Art

In the PAL system two color difference components containing chrominance information are simultaneously encoded by suppressed-carrier quadrature amplitude modulation on a color sub-carrier within the video frequency band. If there is any phase distortion in the transmission path between the encoder at the television station and the demodulators at the receiver, this phase distortion is likely to remain reasonably constant for a period of time much longer than a television line interval. The hue of the television image reconstructed by the receiver from the received signal is determined by the phase angle of the chrominance signal and is, therefore, adversely affected by phase distortion unless it is cancelled out. The PAL system effects cancellation of the phase error by reversing the color sequence at the end of each line. Information as to the color sequence of each line is encoded in the phase of the burst signal preceding that line by shifting the phase of the burst signal 90° forward for one line and 90° back for the next line. Phase distortion that would tend to make the image shift toward the blue end of the color spectrum for one color phase sequence presented during one line will still produce the same phase error in the succeeding line. However, because of the difference in phase sequence between the initial line and the succeeding line, this phase error now shifts the hue toward the red end of the spectrum. Assuming reasonably constant luminance and recognizing the fact that the information in one television line is very little different from that in the next line, the two shifts in hue, one in the blue direction and the other in the red direction, tend to cancel each other out.

In the so-called simple PAL receiver, this cancellation is obtained by visual averaging of the line, but this tends to produce an effect known as a line crawling "-Venetian blind" pattern. It is also possible in a more complex PAL receiver to average out the errors by delaying the chrominance signal by exactly one line interval of time and then combining the delayed signal with the signal for the next scanning line. This substantially eliminates the spurious Venetain blind line patterns at the price of reduced vertical chrominance resolution and at the further price of greatly increasing the complexity of the receiver.

Although the PAL system eliminates phase shift errors that produce a change in hue, it also makes it impossible to change hue deliberately by means of a hue control. Such change is sometimes desirable to correct for effects having nothing to do with phase error.

A co-pending application, Ser. No. 90,904, filed Nov. 19, 1970, entitled COLOR TELEVISION RECEIVER, and assigned to the assignee of the present application discloses a novel system for decoding PAL color television signals in such a way as to avoid some of the limitations inherent in existing PAL decoders. The aforesaid novel system also is theoretically capable of receiving signals transmitted either on the PAL system or on the so-called NTSC system used in the United States, although the actual sub-carrier frequencies used in these two television systems make it impossible to take advantage of this latter feature.

The encoding system of the co-pending application includes a switching circuit and delay means connected to receive the incoming chrominance signal. This chrominance signal is first transmitted directly to the demodulators, for one interval of time, and then the same information, delayed one line interval of time, is again transmitted through the switching circuit to the demodulators for the next line interval. The chrominance information transmitted from the television station during the second line interval is not used by the receiver. The signal transmitted during the third line interval is passed, undelayed, to the demodulators and is repeated, in delayed form, during the fourth line interval of time.

SUMMARY OF THE INVENTION

Another co-pending application, Ser. No. 152,255, filed June 11, 1971, entitled COLOR TELEVISION RECEIVER, and assigned to the assignee of the present application, discloses an improved decoding system utilizing separate switching means and an inverter to obtain burst signals, or inverted replicas thereof, to control one of the sub-carrier generators to produce a reference sub-carrier signal of the proper phase for one of the demodulators. The reference sub-carrier signal for the other demodulator is produced by controlling a separate oscillator by means of each successive burst signal and depending on integration, or averaging, and, if necessary, inversion to produce a second reference sub-carrier signal of the proper phase separated by 90° from the phase of the first reference sub-carrier signal. In each of the embodiments in that application, every successive burst signal was used to achieve the proper control and the proper phase angle of the reference sub-carrier signals even though, by combined switching and delay means, only half of the chrominance signals were used.

It is one of the objects of the present invention to provide an improved system for decoding chrominance signals of a PAL television signal.

Another object is to provide a decoding system in which one reference sub-carrier signal that has a constant phase angle will be produced and the reference sub-carrier signal for the other chrominance component will be produced at an angle different from the correct angle. Either the latter sub-carrier signal will be corrected by vector addition or the resultant demodulated signals will be corrected by matrix operation.

Further objects will be apparent from the following specification and drawings.

In accordance with the present invention, separate oscillator systems are provided to produce reference sub-carrier signals for the two chrominance components. The chrominance components themselves are modulated on a sub-carrier in phase-quadrature and one of the components has a constant modulation axis while the other component has a modulation axis that shifts 180° at the end of each line interval of the television signal. The shifting axis is either plus or minus 90° with respect to the constant axis and the instantaneous chrominance signal is the vector sum of the two component signals. The phase of the vector sum is representative of the hue of the chrominance signal.

In accordance with the present invention, the signal whose modulation axis remains constant is demodulated in a synchronous demodulator utilizing a locally generated reference sub-carrier signal that has the proper phase to demodulate that signal. In one embodiment, the same chrominance signal is fed to a second demodulator and is demodulated by a reference sub-carrier signal that has the same phase as alternate burst signals. This phase is 45° removed form the correct phase and, therefore, the demodulated signal is combined in a matrix circuit with the other demodulated signal and the luminance signal to produce the three primary color output signals to be applied to a color television cathode ray tube.

As an alternative, the locally generated reference subcarrier signal at the incorrect angle may be vectorially added to the locally generated reference sub-carrier signal having the correct constant angle. The vector sum is a second reference sub-carrier signal having the proper angle 90° removed from the sub-carrier signal that has a constant angle. Furthermore, this vectorial addition can take place automatically with the burst signal that corresponds to the chrominance signal that passes through the delay and switching means. The resultant locally generated reference sub-carrier signal will not only be at a 90° angle with respect to the constant reference sub-carrier signal but will be displaced automatically in the proper angular direction.

DESCRIPTION OF THE PREFERRED EMBODIMENTS

Figure 1:
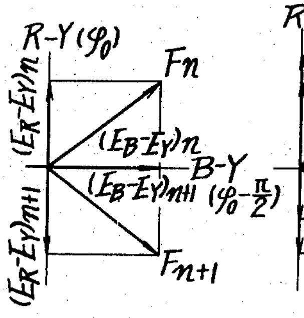
FIG. 1 is a vector diagram for explaining the encoding and decoding of a PAL television system.

The essence of the PAL color television system is in the phase relationship between the two color difference signals modulated on a common sub-carrier to form a chrominance signal. This phase relationship is shown in FIG. 1. One of the chrominance components, $E_B - E_Y$, contains information concerning blue components of the television image. The other, $E_R - E_Y$, contains information relating to red components. Both of these chrominance components are modulated on the same carrier, or more properly the same sub-carrier, but the modulation is performed separately and in such a way that for a given interval of time corresponding to one line of the color television image the carrier on which the chrominance component $E_R - E_Y$ is modulated has a phase $\phi_o$. During the same interval of time the carrier on which the other chrominance component $E_B - E_Y$ is modulated has a phase $\phi-(\pi/2)$. It is for this reason that the chrominance component $(E_B - E_Y)_n$ representing blue information during a given line interval n is represented as a horizontal arrow and the red chrominance component $(E_R - E_Y)_n$ during the same line interval $n$ is represented by a vertical arrow. Vector addition of these two chrominance components produces a resultant signal $F_n$, which is a complex voltage defined by the equation $F_n = (E_B - E_Y)_n + j(E_R - E_Y)_n$.

The phase relationship for the following line $n + 1$ is also represented in FIG. 1. In this case, the blue chrominance component for the line $n + 1$ is $(E_B - E_Y)_{n+1}$, which has the same direction as the component $(E_B - E_Y)_n$. However, in accordance with the PAL system, the red chrominance component $(E_R - E_Y)_{n+1}$ is inverted from the chrominance component that characterized the preceding line n. Thus, the equation for the signal $F_{n+1}$ is $F_{n+1} = (E_B - E_Y)_{n+1} - j(E_R - E_Y)_{n+1}$.

In order to simplify the description of the present invention, the terms "plus" and "minus" will be used in referring to burst and chrominance signals. The term "-plus" will be used to identify those line intervals in which the red color difference component $E_R - E_Y$ has a modulation axis that is vertically upward along the direction $\phi_o$. During such intervals of time, the vector sum of the chrominance components may be referred to as $F_+$ and is shown in FIG. 1 as being in the first quadrant. The burst signal for the same interval is referred to as $B_+$ and is in the second quadrant. It leads the axis $\phi_o$ by 45°°. During the alternate line intervals, when the modulation axis for the red color component is $-\phi_o$ and the red color difference signal may be represented as $-(E_R - E_Y)$, the burst signal $B_-$ is in the third quadrant and lags the $-\phi_o$ axis by 45°. The chrominance signal may be identified as $F_-$ and is in the fourth quadrant.

Figure 2:
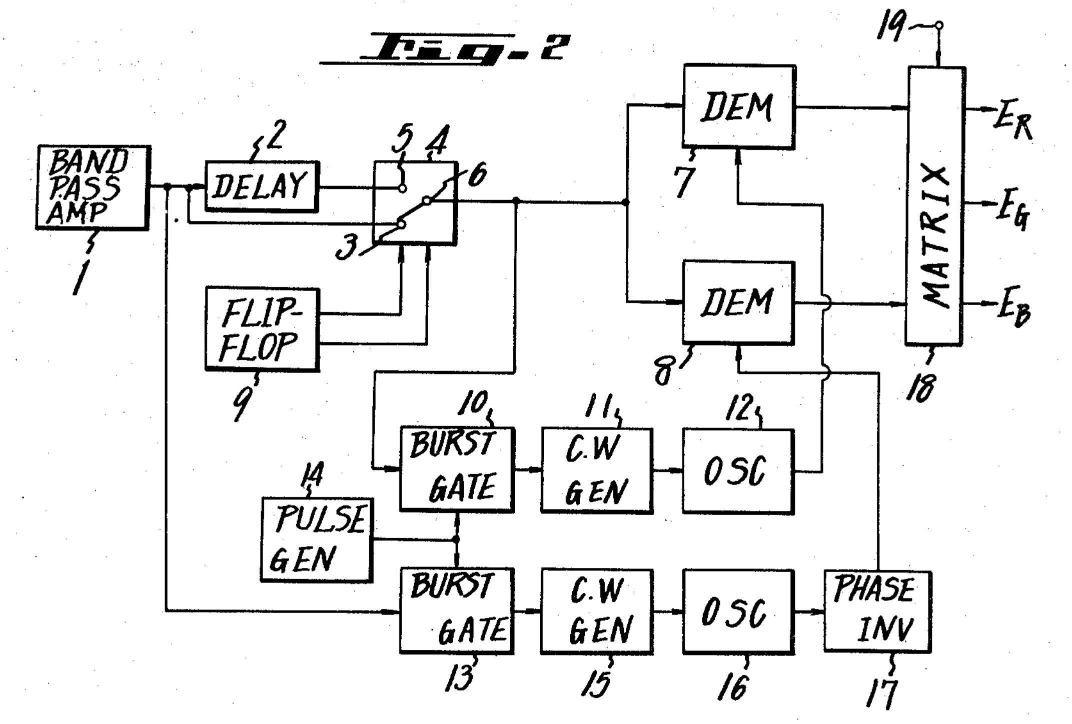
FIG. 2 is a block diagram of one embodiment of a decoding system according to the present invention.

FIG. 2 is a block diagram of a decoding system for use in a color television receiver capable of receiving signals transmitted according to the PAL system and displaying a color television image generated by those signals. The input of the decoding system is at a band pass amplifier 1 which is tuned to transmit the chrominance signals of a composite color television signal. The output of the band pass amplifier 1 is connected to the input of a delay circuit 2 and to one input terminal 3 of a switching circuit 4. The output of the delay circuit 2 is connected to a second input 5 of the switching circuit 4, which operates, in effect, as a single-pole-double-throw switch. The switching circuit has an output terminal 6 that is connected to input terminals of two demodulators 7 and 8 in which the color difference signals are separated from each other. The switching circuit 4 is connected to a flip-flop 9 to have its operation controlled thereby.

The output terminals 6 of the switching circuit 9 is also connected to a burst gate 10. The output of the burst gate 10 is connected, in turn, to a continuous wave generator 11, which may be a crystal oscillator, and the output of the continuous wave generator 11 is connected to an oscillator 12 to control its operation. Signals from the oscillator 12 are connected to the demodulator 7.

The output of the band pass amplifier 1 is also connected to a second burst gate circuit 13. This circuit, and the burst gate circuit 10, are connected to a gate generator 14 to be controlled thereby. The output of the burst gate circuit 13 is connected to a continuous wave generator 15, which may be a crystal oscillator, and the output of the continuous wave generator 15 is connected to an oscillator 16 to control the operation thereof. The output signal from the oscillator 16 is connected in turn to another inverter 17, which supplies signals to the demodulator 8. The outputs of both demodulators 7 and 8 are connected to a matrix circuit, and the luminance signal $E_Y$ is also applied to this matrix circuit through an input terminal 19.

The operation of the circuit in FIG. 2 will be described in conjunction with the phase diagrams in FIGS. 3–5. The chrominance signal represented by the sequence $F_n$, $F_{n+1}$, $F_{n+2}$, $F_{n+3}$ . . . is transmitted through the band pass amplifier 1 and is delayed in the delay circuit 2 by one line period of time. The delayed signal, identified by adding a prime to each of the components, is written $F'_n$, $F'_{n+1}$, $F'_{n+2}$, $F'_{n+3}$ . . . and is applied as a continuous signal to the input terminal 5 of the switching circuit 4. The original chrominance signal $F_n$, $F_{n+1}$, $F_{n+2}$, $F_{n+3}$ . . . is also applied directly to the input terminal 3. The signals applied to the terminals 3 and 5 are transmitted through the switching circuit 4 alternately under the control of the flip-flop 9. As a result, the output signal from the terminal 6 of the switching circuit 4 is $F_n$, $F'_n$, $F_{n+2}$, $F'_{n+2}$ . . . . The first term, $F_n$, consists of an undelayed signal for one line interval when the terminal 3 is connected through to the output terminal 6, as shown. During the next line interval, the flip-flop 9 actuates the switching circuit 4 to connect the input terminal 5 to the output terminal 6. This causes the same signal to be repeated at the output terminal 6 as $F'_n$. In the third line interval, the switching circuit 4 is returned to the condition shown in FIG. 2 so that a new undelayed signal $F_{n+2}$ two lines later than the first undelayed signal is transmitted through to the demodulators 7 and 8. In the fourth interval of time, the switching circuit 4 is changed to the opposite condition in which the output terminal 6 is connected to the input terminal 5 and, because of the delay produced by the circuit 2, the signal $F'_{n+2}$ present during the third interval of time is again transmitted to the demodulators 7 and 8. Thus, the demodulators 7 and 8 receive the same signal for two successive line intervals of time and then another signal for the next two line intervals of time, and so on.

If the signals $F_n$, $F_{n+2}$, $F_{n+4}$ . . . happen to be plus signals and the switching circuit 4 is in the condition indicated in FIG. 2 at the time of arrival of these plus signals, a sequence of plus color difference signals is produced at the output of the demodulator. During the alternate line intervals corresponding to the times of arrival of the signals $F_{n+1}$, $F_{n+}$, $_{Fn+5}$ . . . which must be minus signals since the others were plus, the switching circuit 4 is switched to the opposite condition. As a result, only plus signals are sequentially derived, twice each, from the switching circuit 4 in the order $F_n$, $F'_n$, $F_{n+2}$ . . . and no minus signals are derived therefrom. The demodulator 8 receives the same plus chrominance signals $F_+$. To demodulate the signals in the demodulator 8 in such a way as to produce correct blue color difference signals, the demodulator 8 must be supplied with reference sub-carrier signals having a phase $\phi_o - (\pi/2)$. The output of the demodulator would thus be a sequence of color signals in the order: $(E_B - E_Y)_n$, $(E_B - E_Y)'_n$, $(E_B - E_Y)_{n+2}$, $(E_B - E_Y)'_{n-+2}$ . . . .

If, at the arrival of the plus signals $F_n$, $F_{n+2}$, $F_{n+4}$ . . . the flip-flop circuit 9 is reversed to cause reversal of the switching circuit 4 to the position opposite to the illustrated one, only minus signals are sequentially derived twice from the switching circuit 4 in the following order: $F_{n+1}$, $F'_{n+1}$, $F_{n+3}$, $F'_{n+3}$ . . . and no plus signals are derived therefrom. The demodulator 8 must still be supplied with the reference sub-carrier signal of the phase $\phi_o - (\pi/2)$ as in the foregoing, since its phase remains constant. As a result of this, a train of demodulated color signals $(E_B - E_Y)_{n+1}$, $(E_B - E_Y)'_{n+1}$, $(E_B - E_Y)_{n+3}$, $(E_B - E_Y)'_{n+3}$ . . . is derived from the demodulator 8.

The chrominance signal separated by the band pass amplifier 1 is supplied to the burst gate circuit 13. The burst signals $B_+$ and $B_-$ shown in FIG. 5 and contained in the plus and minus signals are alternately transmitted through this gate circuit under control of the gate generator 14. These burst signals are applied to the continuous wave generator circuit 15 to derive therefrom a continuous wave signal $S_2$ of a phase midway between those of the signals $B_+$ and $B_-$. This continuous wave signal $S_2$ is fed to an oscillator 22 to derive therefrom a signal of the same phase as the signal $S_2$. This signal is applied to the phase inverter 17 to derive therefrom at all times a reference sub-carrier signal $S_3$ of the phase $\phi_o - (\pi/2)$ to be supplied to the demodulator 8. As a result, a predetermined demodulated color signal $(E_B - E_Y)_n$, $(E_B - E_Y)'_n$, $(E_B - E_Y)_{n+2}$, $(E_B - E_Y)'_{n+2}$ . . . is obtained from the demodulator 8 and supplied to the matrix circuit 18.

The derivation of the signal to be applied to the demodulator 7 as a carrier begins with the application of the output signal of the switching circuit 4 to the burst gate 10. This output signal is the same chrominance signal that is applied to the demodulators. Assuming that it is the plus chrominance signal, $F_+$, it will contain a burst signal, $B_+$. This burst signal is separated from the remainder of the signal by the burst gate 10 under control of the gate generator 14. Instead of being derived on each line, this burst signal will be derived only on alternate lines and, therefore, will always have the same phase. Thus, it will not be averaged to a different phase by the time constant of the continuous wave generator will simply produce a signal that has the same phase as the burst signal. The output of the continuous wave generator is fed to the oscillator 12 to produce an output signal $S_1$ which leads the axis $\phi_o$ by 45° as shown in FIG. 3A.

Figure 3A:
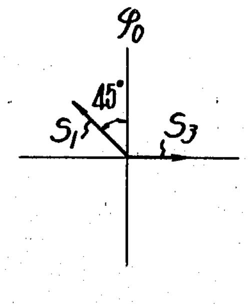
FIGS. 3–5 are vector diagrams showing the relative phase angles between burst signals, reference sub-carrier signals, and chrominance signals and components thereof.
Figure 3B:
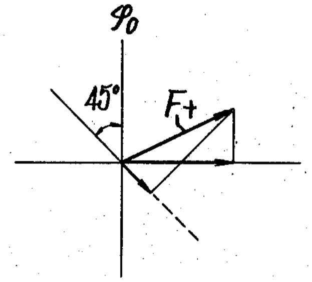

When the signal $S_1$ of FIG. 3A is used to demodulate the $F_+$ chrominance signal, as shown in FIG. 3B, the resultant demodulated signal has the same axis as the $S_1$ signal rather than the vertical axis that would be correct for the red color difference signal. However, the blue color difference signal $(E_B - E_Y)$ is correct and when this signal is applied with the output signal of the demodulator 7 to the matrix circuit 18, and the luminance signal is also applied to the matrix circuit by way of the terminal 19, the three primary color signals $E_R$,$E_G$, and $E_B$ are generated.

Figure 4A:
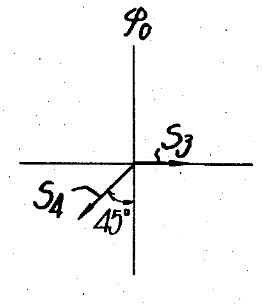
Figure 4B:
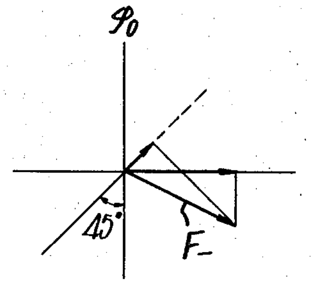

If the switching circuit 4 is in the position shown in FIG. 2 at the time of arrival of a minus chrominance signal $F_-$, the $B_-$ burst signal will be derived therefrom by the burst gate circuit 10 and will cause the oscillator 12 to generate the signal $S_4$ shown in FIG. 4A. When this signal and the signal $S_3$ are applied to the demodulators 7 and 8, respectively, to demodulate the $F_-$ chrominance signal, the blue color difference signal $(E_B - E_Y)$ will be derived correctly as before but a signal along the axis determined by the $S_4$ signal will be derived from the demodulator 7. As in the case of the $F_+$ signal, the application of these demodulated signals, along with the luminance signal, to the matrix circuit 18 will produce proper primary color signals $E_R$, $E_G$, and $E_B$.

Figure 6:
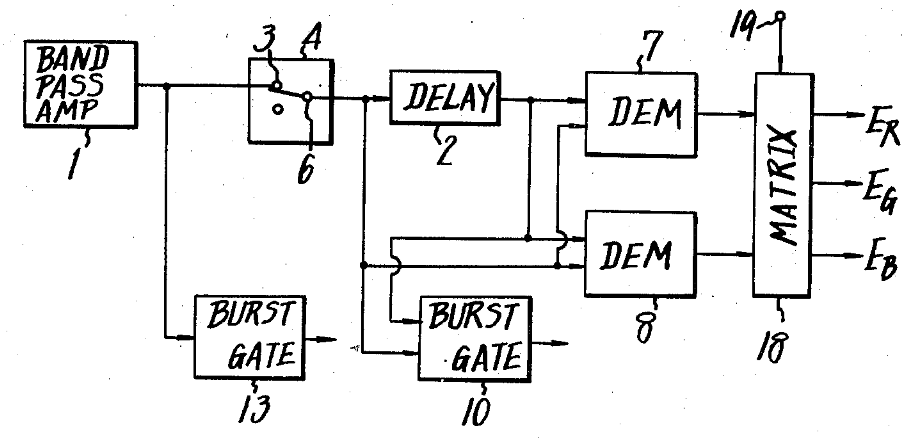
FIG. 6 is a block diagram of a modified embodiment of the present invention.

FIG. 6 illustrates another embodiment of this invention similar to that in FIG. 2 except that the signal switching operation is carried out prior to the delay operation. Chrominance signals transmitted through he band pass amplifier 1 are extracted from alternate lines of the composite color television signal separated by the switching circuit 4, which is, in effect, a single-pole-single-throw switch and are supplied to the demodulators 7 and 8 through two paths. One is a direct path and the other goes through the delay circuit 2 by means of which signals are delayed for one line interval.

Exactly the same demodulating operation as in the example in FIG. 2 can be achieved in the circuit in FIG. 6. The vector diagrams in FIG. 3 are applicable if $F_+$ chrominance signals are being demodulated, and the vector diagrams in FIG. 4 apply to demodulation of $F_-$ chrominance signals.

Figure 7:
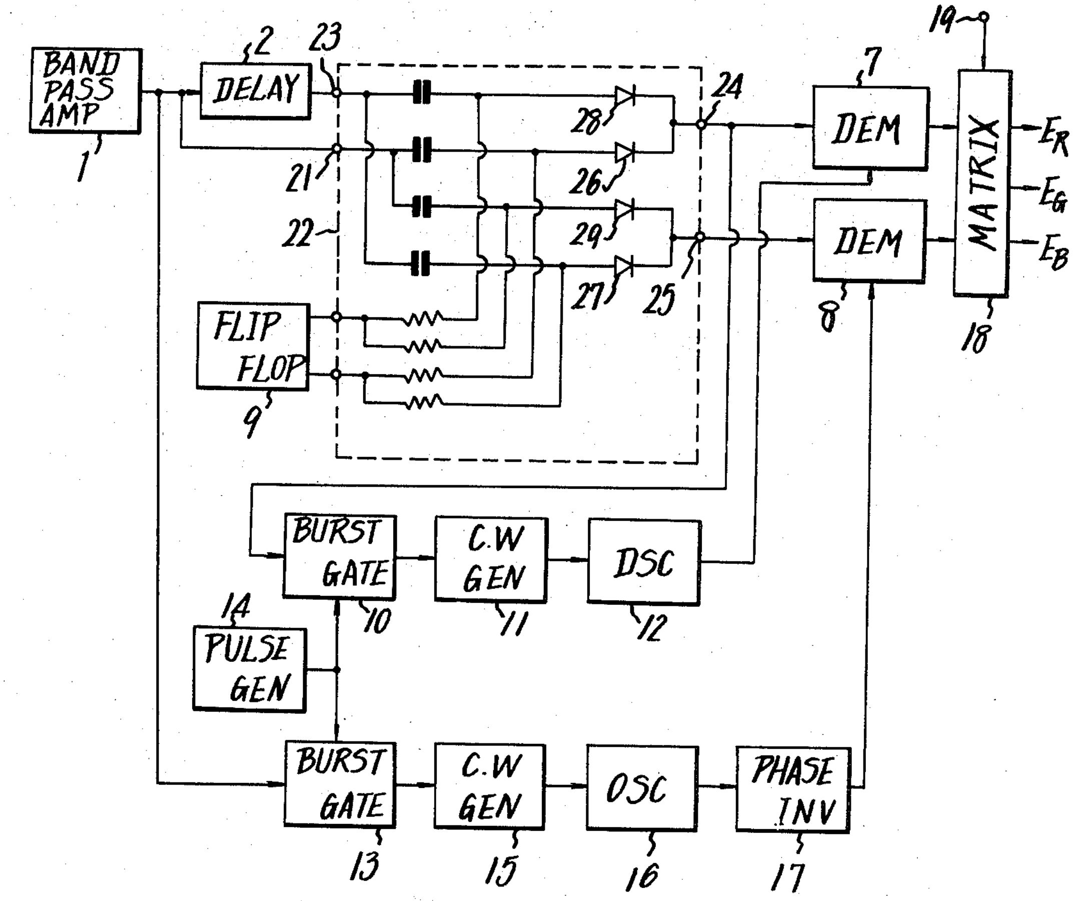
FIG. 7 is a block diagram of another modified embodiment of the invention.

FIG. 7 shows another embodiment of this invention that includes a diode switching arrangement for separating the delayed and non-delayed chrominance signals. The chrominance signals separated from the rest of the composite television signal by the band pass amplifier 1 are applied directly to one input terminal 21 of a diode switching circuit 22 and are also applied to the delay circuit 2. The output of the delay circuit is applied to another input terminal 23 of the switching circuit 22. The operation of the switching circuit 22 is controlled by the flip-flop circuit 9 which causes the switch to change from one of its two conditions to the other at the end of every horizontal scanning line.

The switching circuit 22 has one output terminal 24 connected to the input terminal of the demodulator 7. The switching circuit also has another output terminal 25 connected to the input terminal of the demodulator 8.

Within the switching circuit 22 are four diodes 26–29. Two of the diodes 26 and 27 are connected to one of the output terminals of the flip-flop 9 to be rendered conductive at the same time. The other two diodes 28 and 29 are connected to the other output terminal of the flip-flop circuit 9 to be rendered conductive when the diodes 26 and 27 are non-conductive. The diodes are biased by the output signal of the flip-flop 9 so that one of the demodulators is supplied only with the plus signal $F_+$ and the other is supplied only with the minus signal $F_-$, but whether the demodulator 7 is supplied with the plus signal and the demodulator 8 supplied with the minus signal, or vice versa, depends on the setting of the switching 22 relative to the signal received by the receiver.

Figure 8:
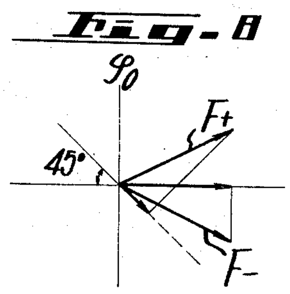
FIGS. 8 and 9 are vector diagrams for explaining the decoding system shown in FIG. 7.
Figure 9:
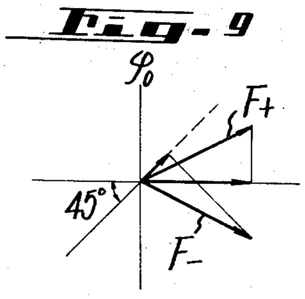

The reference signals to be fed to the demodulators 7 and 8 to achieve demodulation of the chrominance signals are produced in the same manner as described in connection with the circuit in FIG. 2. FIG. 8 shows the demodulated components of a plus chrominance signal $F_+$ attained by using the signals $S_1$ and $S_3$ (FIG. 3A) as carriers for the demodulators 7 and 8, respectively. FIG. 9 shows the demodulated components of the minus chrominance signal $F_-$ utilizing the signals $S_4$ and $S_3$ (FIG. 4) as carrier signals for the demodulators 7 and 8.

Figure 10:
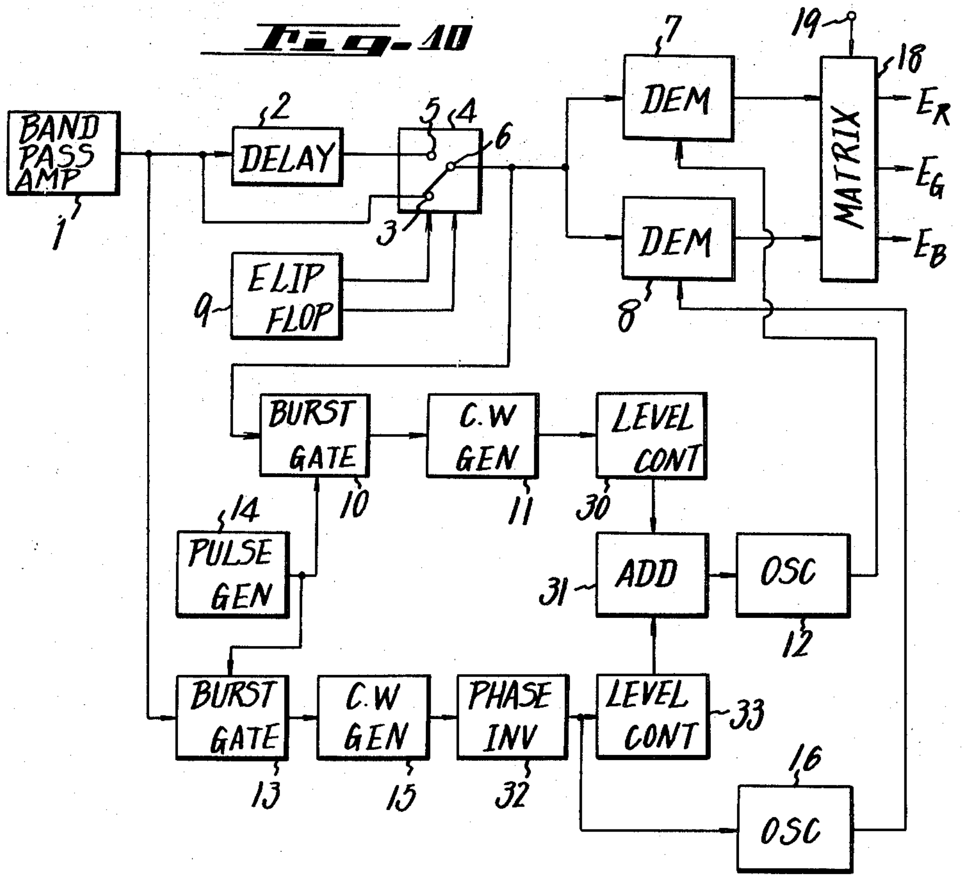
FIG. 10 is a block diagram of still another embodiment of the invention.

FIG. 10 shows a further embodiment of the invention utilizing many of the same components as the embodiment in FIG. 2. These include the delay means 2, the switching circuit 4 and the demodulators 7 and 8. The actuation of the switching circuit is controlled by the flip-flop 9. The burst gate 10 is connected to the output terminal 6 of the switching circuit 4 and is connected to the continuous wave generator 11. The other burst gate 13 is connected to the output of the band pass amplifier 1 and transmits burst signals to the continuous wave generator 15.

The output of the continuous wave generator is connected through a level controlling circuit 30 to one input of an adder circuit 31. The output of the continuous wave generator 15 is connected through a phase inverter 32 to the oscillator 16 and to a second level controlling circuit 33. The output of the level controlling circuit 33 is connected to the adding circuit 31. The output of the adding circuit 31 is applied to control the oscillator 12 which is connected to the demodulator 7 to supply carrier signals thereto. The oscillator 16 supplies carrier signals to the other demodulator 8.

In the operation of the circuit in FIG. 10, either plus chrominance signals $F_+$ or minus chrominance signals $F_-$ will be derived from the switching circuit 4 and applied to both of the demodulators 7 and 8 and to the burst gate 10. Assuming for the moment that the signals are plus chrominance signals $F_+$, they include burst signals $B_+$ which are shown in FIG. 5. These signals pass through the burst gate 10 and control the operation of the continuous wave generator 11 so that it produces a continuous wave having the same phase. This wave is applied to the level controlling circuit 30 which automatically controls the amplitude of the wave and transmits it to the adding circuit 31 with a predetermined amplitude.

Figure 5:
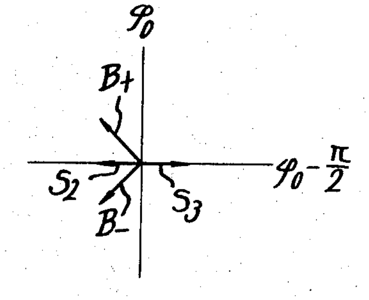

The chrominance signals applied to the other burst gate 13 contain both $B_+$ and $B_-$ burst and, as a result, the phase of the continuous wave generated by the circuit 15 is midway between the phases of the $B_+$ and $B_-$ bursts and is indicated by the vector $S_2$ in FIG. 5. This wave is inverted in the phase inverter 31 and applied to control the oscillator 16 so that the output signal of the latter will have the phase $S_3$ and will, therefore, be correct for demodulating plus color difference components $(E_B - E_Y)$ of the chrominance signal.

Figure 11A:
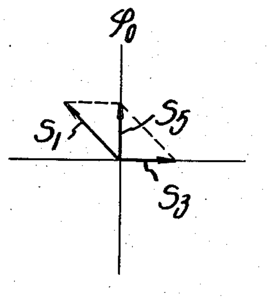
FIG. 11 shows vector diagrams of signals produced in the operation of the decoding system illustrated in FIG. 10.

The signal $S_1$ at the output of the level controlling circuit 30 is shown in FIG. 11. This signal is added in the adder circuit 31 to the signal $S_3$ and the relative magnitudes of these signals is such that the vector sum is $S_5$ and is in the direction of the $\phi_o$ axis, which is the correct axis for demodulating red color difference components of $F_+$ chrominance signals. The output signal of the adder circuit 31 causes the oscillator 12 to produce a signal having the phase of the signal $S_5$ as shown in FIG. 11.

Figure 11B:
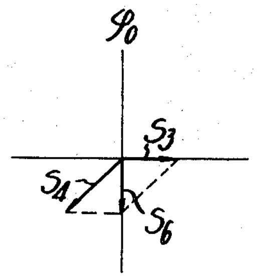

When the relationship between the incoming signal from the band pass amplifier 1 and the operation of the switching circuit 4 is such that $F_-$ chrominance signals are transmitted to the demodulators 7 and 8 and to the burst gate 10, the operation is depicted in FIG. 11B. Under these circumstances, the signal $S_3$ is generated, as before, by the oscillator 16, but the minus burst signal $B_-$ transmitted through the burst gate 10 causes a continuous wave of the same phase to be generated in the circuit 11 and transmitted through the level controlling circuit 30 to the adder circuit 31. At the added circuit 31, the phase and amplitude of this signal may be indicated as $S_4$ and the vector sum of this signal with the signal $S_3$ of the proper amplitude is shown in FIG. 11B as $S_6$ along the $-\phi$ axis. This is the proper relationship for demodulating the red color difference components of $F_-$ chrominance signals.

Figure 13A:
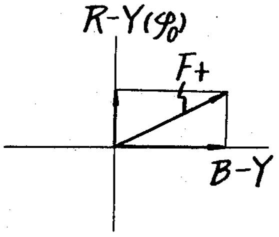
FIG. 13 shows demodulation vector diagrams for the circuit in FIG. 10.
Figure 13B:
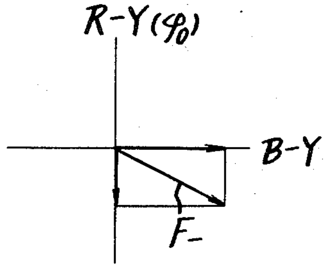

As a result of this automatic production of either the signal $S_5$ or $S_6$, depending on whether the chrominance signal is $F_+$ or $F_-$, the demodulated components are shown in FIGS. 13A and 13B, respectively. The demodulated components have the correct relative angular displacement, which simplifies the matrixing operation to produce the signals $E_R$, $E_G$, and $E_B$, but in order to maintain this correct phase relationship it is essential that the relative amplitudes of the signals $S_1$ and $S_3$, on the one hand, or $S_4$ and $S_3$, on the other hand, be maintained. The phase of the vector resultant signals $S_5$ and $S_6$ depend on the relative amplitude of the component signals making up the vector sum.

Figure 12:
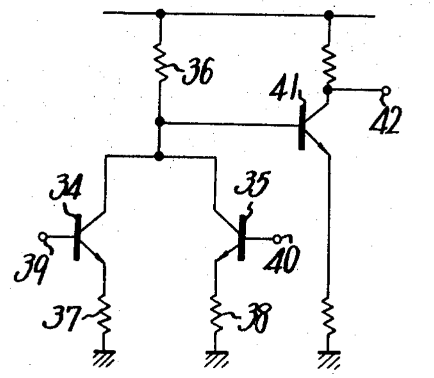
FIG. 12 shows an adder circuit for use in the decoding system of FIG. 10.

FIG. 12 shows a suitable adding circuit for use as the circuit 31 in FIG. 10. Two transistors 34 and 35 have their collectors connected together to a common load 36. Their emitters are grounded through resistors 37 and 38, respectively. The base input terminal 39 of the transistor 34 is connected to the output of the level controlling circuit 30 and the base input terminal 40 of the transistor 35 is connected to the output circuit of the level controlling circuit 32. The common collector of the transistors 34 and 35 are connected to the base of a transistor 41 and the output signal is derived at the collector terminal 38. This terminal may be applied to the oscillator 12 in FIG. 10 to control the operation of that oscillator.

In the foregoing description the non-delayed, original chrominance signal and the chrominance signal delayed behind it for one horizontal line interval are utilized alternatively to produce a continuous selected chrominance signal. As an alternative, it is possible to utilize one line of the original chrominance signal and a signal delayed an odd number of times as long as a horizontal line interval. Furthermore, this invention is not limited to producing reference sub-carrier signals along the R – Y and B – Y axes. The invention is also applicable to producing carrier signals for demodulating I and Q signals or the like.

Figure 14:
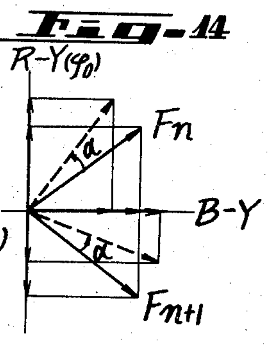
Figure 15:
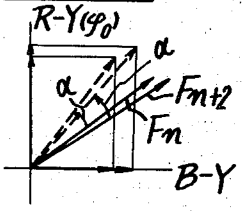

With the present invention, the circuit construction is simple, and there is no deterioration in the quality of the reproduced picture. The receiver employs only the delay circuit 2 and a switching circuit between the band pass amplifier 1 and the demodulators 7 and 8. This is extremely simple in comparison with the so-called standard PAL decoding system. In the simplified PAL decoding system, the signal from the band pass amplifier would be applied directly to the demodulators. When a phase distortion $\alpha$ is present, as shown in FIG. 14, the magnitude of the demodulated color signals of adjacent lines vary in opposite directions, and the saturation difference between the color signals of adjacent lines becomes great enough to cause deterioration in the quality of the reproduced picture. With the present invention, however, there is no difference in saturation between adjacent lines of the same signal. In addition, the difference in saturation caused by the phase distortion $\alpha$ between adjacent lines of different signals is too small to produce any deterioration in the quality of the reproduced picture. This is clear from the vector diagram in FIG. 15.

Further, in accordance with the present invention, two reference signals are produced alternately. One of these has the same phase as selected burst signals that correspond to one line interval of time in which the modulation axis for one color signal has one phase. The other reference signal is a signal opposite in phase to the integrate burst signals for each of the line intervals. These signals are produced by the extraction, first, of a non-delayed chrominance signal and then the extraction of a chrominance signal delayed for one horizontal scanning interval or an odd number of scanning intervals. The sub-carrier signals to be used in demodulating the chrominance signals are produced under the control of the aforesaid reference signals. Consequently, the chrominance signals applied to the demodulators can always be demodulated with sub-carrier signals of predetermined phases irrespective of the alternate extracting operation of the non-delayed signal and the delayed signal. Furthermore, this extraction need not be controlled, which permits further simplification of the circuit construction of the present invention.

What is claimed is:

1. A color television decoding system for a receiver adapted to receive a composite color television signal comprising color synchronizing burst signals, luminance single components, and first and second chrominance signal components amplitude modulated on a common sub-carrier and having quadrature-phase modulation axes, the color phase sequence of the first and second chrominance signal components being periodically reversed, said decoding system comprising:

A. Delay means for delaying said chrominance components a predetermined length of time;

B. Switching means for transmitting segments of said chrominance components for selected intervals of time, each equal to said predetermined length of time, whereby said delay means and said switching means cooperate to produce a continuous selected chrominance signal;

C. First and second demodulator means to demodulate said continuous selected chrominance signal;
D. First and second generator means to generate first and second signals, respectively, said first signal having a fixed one of said modulation axes, and said second signal coinciding in phase with selected burst signals;
E. Control means connected to said generator means to control the phase of said signals;
F. Means connecting said first generator means to said first demodulator means to derive said first chrominance component; and
G. Means connecting said second generator means to said second demodulator means to derive a demodulated signal.

2. The decoding system of claim 1 in which said control means comprises means connected to said second generator to maintain the phase of said second signal coincident with the phase of burst signals in said continuous selected chrominance signal.

3. The decoding system of claim 2 comprising, in addition, a matrix circuit connected to said demodulators and to a source of said luminance signal components to derive color component signals.

4. The decoding system of claim 1 in which said control means comprises:
A. A first burst gate circuit connected to receive at least said synchronizing burst signals; and
B. A gate generator connected to said burst gate to render said gate conductive to transmit said burst signals to said first generator means.

5. The decoding system of claim 4 in which said first generator means comprises a time constant to average the phase of burst signals applied thereto, whereby said first generator generates said first signal having a phase midway between the phase of successive burst signals transmitted through said burst gate.

6. The decoding system of claim 5 in which said first generator means comprises:
A. A continuous wave generator connected to said first burst gate to be controlled by burst signals transmitted therethrough;
B. A first oscillator connected to said first continuous wave generator to be controlled thereby, said first continuous wave generator and said first oscillator producing oscillations at the frequency of said burst signal and having a phase 180° from said one of said modulation axes; and
C. A phase inverter connected to said first oscillator to invert said oscillations to produce said first signal.

7. The decoding system of claim 4 comprising, in addition, a second burst gate circuit connected to receive said continuous selected chrominance signal, said second burst gate circuit being connected to said gate generator to be controlled thereby to transmit burst signals from said continuous selected chrominance signal to said second generator means.

8. The decoding system of claim 7, in which:
A Said delay means comprises:
1. an input terminal to be connected to a source of said chrominance signal components, and
2. an output terminal; and
B. Said switching means comprises:
1. first and second input terminals, and
2. an output terminal, said first input terminal being connected to the source of said chrominance signal components, said second input terminals being connected to said output terminal of said delay means, and said output terminal of said switching means being connected to both of said demodulator means and to said second burst gate to supply said continuous selected chrominance signal thereto.

9. The decoding system of claim 7, in which:
A. Said first switching means comprises:
1. an input terminal to be connected to a source of said chrominance signal components, and
2. an output terminal; and
B. Said delay means comprises:
1. an input terminal connected to said output terminal of said first switching means, and
2. an output terminal connected to said demodulators and to said second burst gate to supply delayed repetitions of said segments of said chrominance components thereto.

10. The decoding system of claim 1, in which:
A. Said delay means comprises:
1. an input terminal to be connected to a source of said chrominance signal components, and
2. an output terminal; and
B. Said switching means comprises:
1. a first input terminal connected to the source of said chrominance signal components,
2. a second input terminal connected to said output terminal of said delay means,
3. a first output terminal connected to said first demodulator means and to said second burst gate to supply said continuous selected chrominance signal thereto, and
4. a second output terminal connected to said second demodulator means to supply said continuous selected chrominance signal thereto.

11. The decoding system of claim 1 in which said means connecting said second generator to said second demodulator means comprises an added circuit connected to said first and second generators to add, vectorially, the signals therefrom to produce an output signal having a phase corresponding to the other of said quadrature-phase modulation axes.

12. The decoding system of claim 11 comprising, in addition, signal level control means to control the relative level of said signal applied to said adder circuit to control the output phase of the vector sum thereof.

13. The decoding system of claim 12 in which said level control means comprises:
A. A first automatic level control circuit connected between said first generator and said adder circuit; and
B. A second automatic level control circuit connected between said second generator and said adder circuit.

14. The decoding system of claim 13, comprising, in addition, an oscillator connected to said adder circuit to be controlled thereby to produce oscillations in phase with the output signal of said adder circuit, said oscillator being connected to said second demodulator to supply a reference sub-carrier signal thereto having a phase corresponding to the other of said quadrature-phase modulation axes.

* * * * *

UNITED STATES PATENT OFFICE
CERTIFICATE OF CORRECTION

Patent No. 3,721,751 Dated March 20, 1973

Inventor(s) Yoshiharu Taira

It is certified that error appears in the above-identified patent and that said Letters Patent are hereby corrected as shown below:

In the heading of the patent:

The patent should indicate that the right of priority was claimed under Japanese Patent Application 91334/70, filed October 17, 1970 and Japanese Patent Application 101284/70, filed November 17, 1970.

Signed and sealed this 20th day of November 1973.

(SEAL)
Attest:

EDWARD M.FLETCHER,JR.
Attesting Officer

RENE D. TEGTMEYER
Acting Commissioner of Patents